US010311180B2

(12) United States Patent
Belyi et al.

(10) Patent No.: US 10,311,180 B2
(45) Date of Patent: Jun. 4, 2019

(54) SYSTEM AND METHOD OF RECOVERING LAGRANGE MULTIPLIERS IN MODAL DYNAMIC ANALYSIS

(71) Applicant: Dassault Systèmes Simulia Corp., Providence, RI (US)

(72) Inventors: Mikhail Belyi, Easton, MA (US); Vladimir Belsky, Mansfield, MA (US); Victor Oancea, Greenwich, RI (US)

(73) Assignee: Dassault Systemes Simulia Corp., Johnston, RI (US)

( * ) Notice: Subject to any disclaimer, the term of this patent is extended or adjusted under 35 U.S.C. 154(b) by 810 days.

(21) Appl. No.: 14/331,442

(22) Filed: Jul. 15, 2014

(65) Prior Publication Data

US 2016/0019325 A1    Jan. 21, 2016

(51) Int. Cl.
*G06F 17/50* (2006.01)
(52) U.S. Cl.
CPC ...... *G06F 17/5018* (2013.01); *G06F 2217/16* (2013.01)
(58) Field of Classification Search
CPC .......................... G06F 17/5018; G06F 2217/16
See application file for complete search history.

(56) References Cited

U.S. PATENT DOCUMENTS

| 5,920,491 | A | * | 7/1999 | Hibbitt | G06F 17/10 700/97 |
| 6,090,147 | A | * | 7/2000 | Bremner | G06F 17/5018 702/108 |
| 6,353,801 | B1 | * | 3/2002 | Sercu | G01R 31/2848 702/173 |
| 6,704,693 | B1 | * | 3/2004 | Fan | G06F 17/5018 700/98 |
| 7,188,039 | B2 |   | 3/2007 | Bennighof |  |
| 7,392,502 | B2 | * | 6/2008 | Percin | G03F 1/36 430/30 |
| 7,822,289 | B2 |   | 10/2010 | Szeliski |  |

(Continued)

OTHER PUBLICATIONS

Barbic, FEM Simulation of 3D Deformable Solids: A practitioner's guide to theory, discretization and model reduction. Part 2: Model Reduction , Aug. 4, 2012, pp. 1-15.*

(Continued)

*Primary Examiner* — S. Sough
*Assistant Examiner* — Phuong N Hoang
(74) *Attorney, Agent, or Firm* — Hamilton, Brook, Smith & Reynolds, P.C.

(57) ABSTRACT

Modal dynamic analysis for finite element models (FEMs) that include Lagrange multipliers may generate incorrect stress and reaction forces. Computer systems and computer-implemented methods are provided for modifying the modal analysis to correctly generate stress and reaction forces. The systems and methods perform the modal analysis by employing a FEM and modeling stress and reaction forces of the FEM using Lagrange multipliers. The systems and methods calculate a correction term that comprises corrected values of the Lagrange multipliers. The methods and systems modify (and improve) the modal analysis by using the correction term to correct the Lagrange multipliers of the FEM, which enables the modal analysis to generate correct stress and reaction forces.

20 Claims, 3 Drawing Sheets

110

111 Provide a finite element model (FEM), the FEM employed in a modal analysis for modeling stress and reaction forces of the FEM using Lagrange multipliers 112 Calculate a correction term 113 Modify the modal analysis using the correction term to alter the Lagrange multipliers

(56) References Cited

U.S. PATENT DOCUMENTS

| | | | |
|---|---|---|---|
| 8,000,942 B2* | 8/2011 | El-Wardany | B23D 43/04 |
| | | | 703/1 |
| 9,063,882 B1 | 6/2015 | Zhao | |
| 9,361,413 B1* | 6/2016 | Bout | G06F 17/5018 |
| 10,061,878 B2 | 8/2018 | Bouzinov et al. | |
| 2003/0046050 A1* | 3/2003 | Padilla | G06F 19/701 |
| | | | 703/12 |
| 2003/0076990 A1* | 4/2003 | Brand | G06T 17/10 |
| | | | 382/154 |
| 2007/0286468 A1* | 12/2007 | Joshi | A61B 5/415 |
| | | | 382/131 |
| 2010/0082724 A1 | 4/2010 | Diyankov et al. | |
| 2010/0211370 A1* | 8/2010 | Maliassov | G01V 11/00 |
| | | | 703/10 |
| 2013/0085730 A1* | 4/2013 | Shaw | G01V 11/00 |
| | | | 703/2 |
| 2013/0090902 A1* | 4/2013 | Yao | E21B 43/26 |
| | | | 703/2 |
| 2013/0218538 A1 | 8/2013 | Fuecker et al. | |
| 2017/0177769 A1 | 6/2017 | Bouzinov et al. | |

OTHER PUBLICATIONS

Huttler, "Visualisation of User Defined Finite Elements with Abaqus/View", Institute of Mechanics and Fluid Dynamics, TU Bergakademie Freiberg, 2012, pp. 7-14.*

Craig, R.R., Jr., et al., "Fundamentals of Structural Dynamics", Second Edition, *John Wiley & Sons, Inc.*, Chapters 11 and 14 (2006).

Komzsik, L., "What Every Engineer Should Know About Computational Techniques of Finite Element Analysis", Second Edition, *CRC Press*, Chapters 13 and 15 (2009).

Simeon, B., "On Lagrange multipliers in flexible multibody dynamics", *Comput. Methods Appl. Mech. and Engrg.*, 195:6993-7005 (2006).

Yang, Shih-Ming, "Modal Analysis of Structures with Holonomic Constraints", AIAA Journal, vol. 30(10):2526-2531 (Oct. 1992).

Abaqus Theory Manual, "Implicit Dynamic Analysis," pp. 2.4.1-1-2.4.1-7 (2014).

Bakhvalov, N.S., "Numerical Methods: Analysis, Algebra, Ordinary Differential Equations," MIR, 18 pgs. (1997).

Bathe, Klaus-Jurgen, "Finite Element Procedures," *Prentice Hall*, pp. 749-761 (1982).

Bianchi, et al., "Using modal damping for full model transient analysis, Application to pantograph/catenary vibration," *Proceedings of ISMA2010 Including USD2010*, pp. 1167-1180, (2010).

Clough, R.W., and Penzien, Joseph, Dynamics of Structures, *Computers & Structures, Inc.*, 3$^{rd}$ Edition, pp. 234-242 (2003).

Demmel, J.W., "Applied Numerical Linear Algebra," *Society for Industrial and Applied Mathematics*, 14 pgs. (1997).

Girard, A., and Roy, N., "Structural Dynamics in Industry," *John Wiley and Sons, Inc.*, pp. 96, 97, and 115-121 (2008).

Hager, W.W., "Updating the Inverse of a Matrix," *Society for Industrial and Applied Mathematics*, vol. 31 No. 2, pp. 221-239 (1989).

Higham, N.J., "Accuracy and Stability of Numerical Algorithms," *Society for Industrial and Applied Mathematics*, 2$^{nd}$ Edition, p. 258 (2002).

Hilber et al., "Collocation, Dissipation and 'Overshoot' for Time Integration Schemes in Structural Dynamics," *Earthquake Engineering and Structural Dynamics*, vol. 6, pp. 99-117 (1978).

Hilber, H.M., et al., "Improved Numerical Dissipation for Time Integration Algorithms in Structural Dynamics," *Earthquake Engineering and Structural Dynamics*, vol. 5, pp. 283-292 (1977).

Korotkov, V., et al., "Account of Modal Damping Instead Rayleigh One in Floor Response Spectra Analysis in Civil Structures of Nuclear Power Plants (NPP) Under Aircraft Crash," *2014 Simulia Community Conference*, pp. 1-12 (2014).

Newmark, N.M., "A Method of Computation for Structural Dynamics," *Journal of the Engineering Mechanics Division, Proceedings of the American Society of Civil Engineers*, pp. 67-94 (1959).

Saad, Yousef, "Iterative Methods for Sparse Linear Systems," *Society for Industrial and Applied Mathematics*, 567 pgs. (2003).

Van der Vorst, H.A., "Iterative Krylov Methods for Large Linear Systems," *Cambridge Monographs on Applied and Computation Mathematics*, 18 pgs. (2003).

Wilson, E.L. and Penzien, J. "Evaluation of Orthogonal Damping Matrices," *International Journal for Numerical Methods in Engineering*, vol. 4, pp. 5-10 (1972).

Extended EP Search Report for EP 15 176 734 dated Nov. 13, 2015 entitled "System and Method of Recovering Lagrange Multipliers in Modal Dynamic Analysis".

Jezequel L et al: "A procedure for improving component-mode representation in structural dynamic analysis", Journal of Sound & Vibration, London, GB. vol. 144, No. 3, Feb. 8, 1991, pp. 409-419.

Friswell: "Model updating in structural dynamics", Journal of Sound and Vibration, Jan. 1, 1993, pp. 347-375.

Dhandole S D et al: "A comparative study of methodologies for vibro-acoustic FE model updating of cavities using simulated data", International Journal of Mechanics and Materials in Design, Kluwer Academic Publishers, DO, vol. 6, No. 1, Mar. 11, 2010, pp. 27-43.

Zienkiewicz, O.C., et al., "The Finite Element Method: Its Basis and Fundamentals", 6$^{th}$ Edition, Elsevier Butterworth-Heinemann, 2005.

Lanczos, C., "The Variational Principles of Mechanics", 4$^{th}$ Edition, Dover Publications, 1986.

Bindel; "Matrix Computations—Sherman-Morrison-Woodbury;" (Fall 2009) pp. 1-5; XP055369034.

Extended European Search Report for Application No. 16206366.3; Dassault Systemes Simulia Corp.; dated May 16, 2017; 14 pages.

Kim et al.; "Fast frequency response analysis of partially damped structures with non-proportional viscous damping;" Journal of Sound and Vibration 297 (2006) pp. 1075-1081.

Kim; "A preconditioned iterative method for modal frequency-response analysis of structures with non-proportional damping;" Journal of Sound and Vibration 297 (2006) pp. 1097-1103.

Kim; "Damped dynamic response determination in the frequency domain for partially damped large scale structures;" Journal of Sound and Vibration 326 (2009) pp. 703-708.

* cited by examiner

SYSTEM AND METHOD OF RECOVERING LAGRANGE MULTIPLIERS IN MODAL DYNAMIC ANALYSIS

BACKGROUND OF THE INVENTION

The invention generally relates to the field of computer programs and systems, and specifically to the field of computer aided design (CAD), computer-aided engineering (CAE), modeling, and simulation.

A number of systems and programs are offered on the market for the design of parts or assemblies of parts. These so called CAD systems allow a user to construct and manipulate complex three-dimensional models of objects or assemblies of objects. CAD systems thus provide a representation of modeled objects using edges or lines, in certain cases with faces. Lines, edges, faces, or polygons may be represented in various manners, e.g., non-uniform rational basis-splines (NURBS).

These CAD systems manage parts or assemblies of parts of modeled objects, which are mainly specifications of geometry. In particular, CAD files contain specifications, from which geometry is generated. From geometry, a representation is generated. Specifications, geometry, and representations may be stored in a single CAD file or multiple CAD files. CAD systems include graphic tools for representing the modeled objects to the designers; these tools are dedicated to the display of complex objects. For example, an assembly may contain thousands of parts. A CAD system can be used to manage models of objects, which are stored in electronic files.

The advent of CAD and CAE systems allows for a wide range of representation possibilities for objects. One such representation is a finite element analysis (FEA) model. The terms FEA model, finite element model (FEM), finite element mesh, and mesh are used interchangeably herein. A FEM typically represents a CAD model, and thus, may represent one or more parts or an entire assembly. A FEM is a system of points called nodes which are interconnected to make a grid, referred to as a mesh. The FEM may be programmed in such a way that the FEM has the properties of the underlying object or objects that it represents. When a FEM is programmed in such a way, it may be used to perform simulations of the object that it represents. For example, a FEM may be used to represent the interior cavity of a vehicle, the acoustic fluid surrounding a structure, and any number of real-world objects, including medical devices such as stents. When a given FEM represents an object and is programmed accordingly it may be used to simulate the real-world object itself. For example, a FEM representing a stent may be used to simulate the use of the stent in a real-life medical setting.

SUMMARY OF THE INVENTION

Embodiments of the present invention provide methods and apparatuses for performing modal analysis. According to at least one example embodiment, a method of performing modal analysis comprises: providing a finite element model (FEM), the FEM employed in a modal analysis for modeling stress and reaction forces of the FEM using Lagrange multipliers, calculating a correction term, and modifying the modal analysis using the correction term to alter the Lagrange multipliers.

In an embodiment of the method, calculating the correction term comprises solving a system of equations of motion of the FEM by solving a system of linear algebraic equations with a sparse matrix. According to such an embodiment, the sparse matrix of the system of linear algebraic equations may only be factorized once in the modal analysis. In an alternative embodiment, modifying the modal analysis using the correction term to alter the Lagrange multipliers comprises modifying one or more degrees of freedom associated with the Lagrange multipliers.

According to yet another embodiment, the modal analysis models a structural response of the FEM as a superposition of eigenmodes. In such an embodiment, the eigenmodes may be obtained in a frequency extraction analysis that is a component of the modal analysis. In yet another embodiment, the Lagrange multipliers are corrected for all frequency points of the modal analysis.

An embodiment of the present invention is directed to a system for performing modal analysis. In such an embodiment, the system comprises a simulation module configured to provide a FEM, the FEM employed in a modal analysis for modeling stress and reaction forces of the FEM using Lagrange multipliers. The system in such an embodiment further comprises a correction module operatively coupled to the simulation module and configured to calculate a correction term and to modify the modal analysis using the correction term to alter the Lagrange multipliers.

According to an embodiment of the system, the correction module may be configured to calculate the correction term by solving a system of equations of motion of the FEM by solving a system of linear algebraic equations with a sparse matrix. In such an embodiment, the correction module may be configured to factorize the sparse matrix of the linear algebraic equations once in the modal analysis. In yet another embodiment, the correction module is configured to modify the modal analysis using the correction term to alter the Lagrange multipliers by modifying one or more degrees of freedom associated with the Lagrange multipliers.

According to an embodiment of the system, the modal analysis models a structural response of the FEM as a superposition of eigenmodes. In such an embodiment, the simulation module may be configured to obtain the eigenmodes in a frequency extraction analysis that is a component of the modal analysis. In an alternative embodiment of the system, the correction module is configured to correct the Lagrange multipliers for all frequency points of the modal analysis.

Yet another embodiment of the present invention is directed to a cloud computing implementation for performing modal analysis. Such an embodiment is directed to a computer program product executed by a server in communication across a network with one or more clients. In such an embodiment, the computer program product comprises a computer readable medium which comprises program instructions, which, when executed by a processor causes: providing a FEM, the FEM employed in a modal analysis for modeling stress and reaction forces of the FEM using Lagrange multipliers, calculating a correction term, and modifying the modal analysis using the correction term to alter the Lagrange multipliers.

In such a cloud computing embodiment, calculating the correction term may comprise solving a system of equations of motion of the FEM by solving a system of linear algebraic equations with a sparse matrix. Further still, in another embodiment, the computer program product is configured to factorize the sparse matrix of the system of linear algebraic equations once in the modal analysis. In a further embodiment of the computer program product, modifying the modal analysis using the correction term to alter the Lagrange multipliers comprises modifying one or more degrees of freedom associated with the Lagrange multipliers. According to an embodiment of the computer program product, the modal analysis models a structural response of the FEM as a superposition of eigenmodes. In such an embodiment, the eigenmodes may be obtained in a frequency extraction analysis that is a component of the modal analysis.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Modal analysis is one simulation technique that utilizes FEMs. A modal analysis studies the dynamic properties or structural characteristics of a mechanical structure under dynamic excitation, such as vibration. Modal analysis may be performed using simulation software such as Abaqus®, which is provided by Dassault Systèmes Simulia Corp. Further, while modal analysis may be performed in a variety of ways, one such way to perform modal analysis is to calculate the structural response of the FEM as a superposition of the eigenmodes obtained by the eigensolver in a frequency extraction analysis. One or more embodiments of the present invention improve on this technique by improving the accuracy of Lagrange multiplier degrees of freedom in the modal structural response.

Many finite element formulations such as hybrid, contact, connector, distributed coupling, and other element types are based on the concept of Lagrange multipliers. Modal dynamic analysis for the FEMs that include Lagrange multipliers may generate grossly incorrect stress and reaction force results and it may be very difficult, and even practically impossible, to achieve acceptable accuracy for these results by increasing the number of eigenmodes used in the analysis.

Embodiments of the present invention overcome the shortcomings of these existing methods by correcting the computed values of the Lagrange multipliers in the modal dynamic solution. In an example embodiment, the correction term is calculated by solving a system of linear algebraic equations with the sparse matrix. One advantage of such an embodiment is that the matrix of the system of equations need only be factorized once during the analysis, thus, barely affecting the computational performance of the overall solution.

Figure 1:
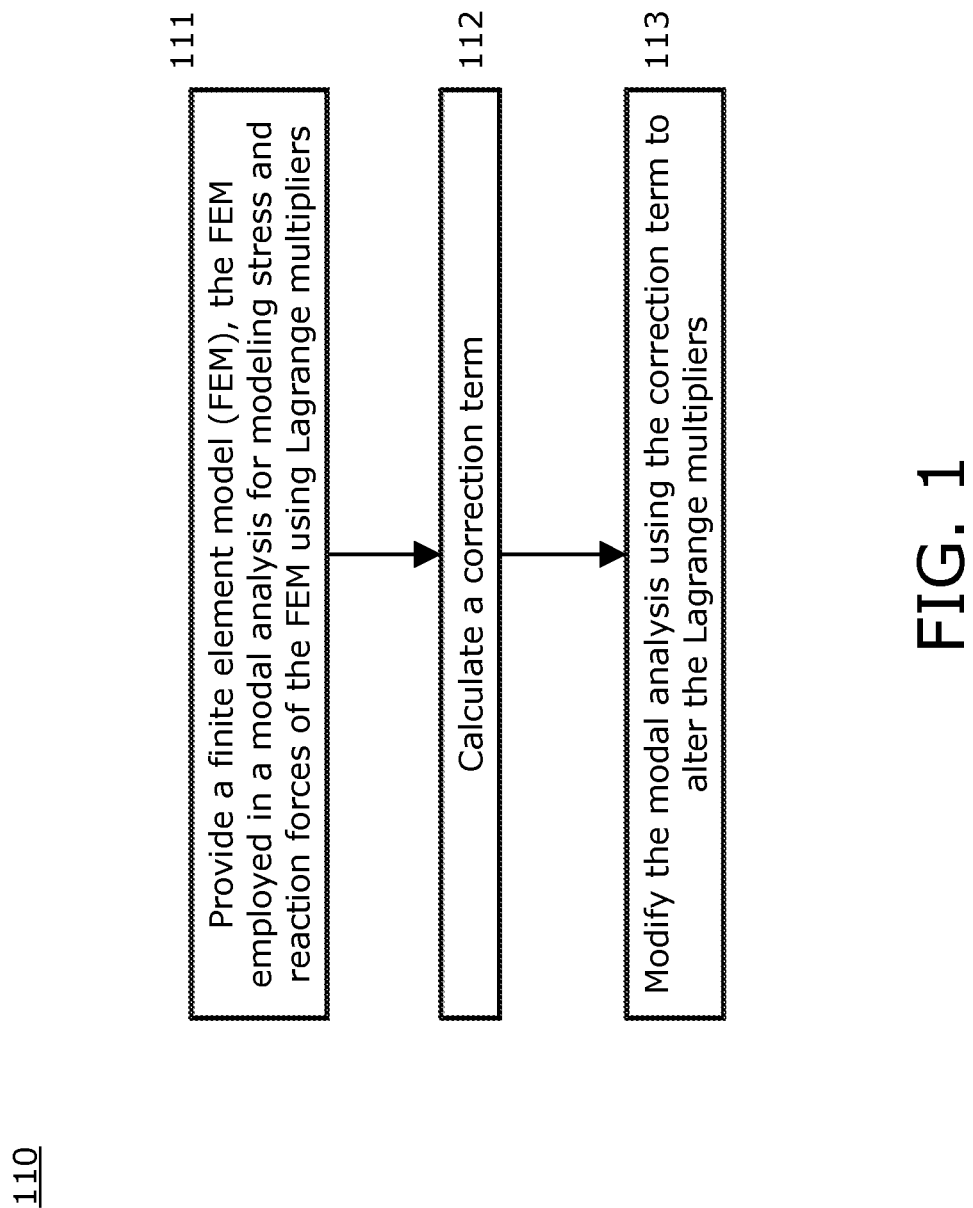
FIG. 1 is a flowchart depicting a method of performing a modal analysis according to at least one example embodiment.

FIG. 1 is a flow diagram of a method 110 for performing a modal analysis according to an embodiment of the present invention. The method 110 begins by providing a FEM (111). The FEM provided at block 111 is employed in a modal analysis for modeling stress and reaction forces of the FEM using Lagrange multipliers. The FEM may be provided/obtained through any means known in the art. For example, in an embodiment of the method 110, executed on a computing device, the FEM may be provided via any point communicatively coupled to the computing device via any means known in the art. For example, the FEM may be provided via a local area network (LAN) or a wide area network (WAN). The modal analysis that employs the FEM may be carried out using any existing CAD/CAE/simulation tool, such as Abaqus®, that is modified according to the principles described herein.

The method 110 continues by calculating a correction term (112). According to an embodiment of the method 110, calculating the correction term 112 comprises solving a system of equations of motion of the FEM by solving a system of linear algebraic equations with a sparse matrix. According to such an implementation, in an embodiment, the sparse matrix of the system of linear algebraic equations is factorized once in the modal analysis. In another embodiment of the method 110, the correction term is calculated as described hereinbelow.

The method 110 concludes by modifying 113, the modal analysis using the correction term to alter the Lagrange multipliers. According to an embodiment of the method 110, altering the Lagrange multipliers comprises modifying one or more degrees of freedom associated with the Lagrange multipliers. In yet another embodiment of the method 110, the Lagrange multipliers are corrected for all frequency points of the modal analysis. Yet further still, modifying the modal analysis using the correction term 113 comprises modifying the modal analysis results. Further, modifying the modal analysis 113, may be performed according to any method described herein.

According to an embodiment of the method 110, the modal analysis may model a structural response of the FEM as a superposition of eigenmodes. In such an embodiment, the eigenmodes may be obtained in a frequency extraction analysis that is a component of the modal analysis. Further still, according to an example embodiment of the method 110, the Lagrange multipliers may be corrected for all frequency points of the modal analysis.

It should be understood that the example embodiments of the method 110 described herein may be implemented in many different ways. In some instances, the various embodiments may each be implemented by a physical, virtual, or hybrid general purpose computer. For example, in an embodiment of the method 110 implemented in a computing device, software instructions for executing the method 110 may be loaded into memory and executed by one or more processors. Further still, in an example embodiment, the various components of the method 110 may be incorporated into an existing system and/or software application/suite for performing a modal analysis.

As described hereinabove, according to an embodiment of the method 110, calculating the correction term 112 comprises solving a system of equations of motion of the FEM. According to such an embodiment, the method 110 may comprise defining equations of motion of the constrained system. For example, the system of equations of motion for a FEM with n degrees of freedom may be defined as:

$$M\ddot{u}+C\dot{u}+Ku=f(t)$$

where $u=u(t)$ is the displacement vector, K is the stiffness matrix, C is the damping (viscous damping) matrix, M is the mass matrix, and f(t) is the right hand side vector that can depend on time. The upper dot denotes the time derivative. The stiffness matrix K, damping matrix C, mass matrix M, and the right hand side f(t) may be defined according to principles known in the art so that the FEM may simulate the real world object that it represents. In such an embodiment, it may be assumed that m<n constraints are applied so that the solution u satisfies the following linear constraint equation:

$$G^T u = 0$$

Where G is the matrix containing the coefficients of the linear constraint equations. Hereinbelow superscript T defines the matrix transposition. In such an embodiment, it may be further assumed that the rank(G)=m. Thus, the columns of the n×m matrix G are linearly independent.

The defined equations of motion may be further utilized to calculate the correction term (112). According to an embodiment, using the Lagrange multiplier technique, the constrained problem for the original model with n degrees of freedom may be formulated as an unconstrained problem for a system with (n+m) degrees of freedom where the solution vector takes the form:

$$\begin{Bmatrix} u \\ \lambda \end{Bmatrix} \in R_{n+m}$$

After formulating the solution vector as shown above, the system of equations of motion may then be written as:

$$\begin{bmatrix} M & 0 \\ 0 & 0 \end{bmatrix} \begin{Bmatrix} \ddot{u} \\ \ddot{\lambda} \end{Bmatrix} + \begin{bmatrix} C & 0 \\ 0 & 0 \end{bmatrix} \begin{Bmatrix} \dot{u} \\ \dot{\lambda} \end{Bmatrix} + \begin{bmatrix} K & G \\ G^T & 0 \end{bmatrix} \begin{Bmatrix} u \\ \lambda \end{Bmatrix} = \begin{Bmatrix} f(t) \\ 0 \end{Bmatrix}$$

where the vector λ represents the set of Lagrange multipliers.

With the system of equations above, the method 110 at block 112 (calculate a correction term) can then proceed to develop the representation of the solution. Such an embodiment begins by constructing a basis in $R_{n+m}$ that is suitable for the representation of the constrained dynamic problem solution. Such a basis may consist of three sets of vectors, specifically, Φ—eigenvectors (modal subspace), Ψ—Lagrange multiplier corrections, and Z—complementary basis vectors.

The Φ—eigenvectors, include the eigenvector of the following generalized eigenvalue problem:

$$\begin{bmatrix} K & G \\ G^T & 0 \end{bmatrix} \begin{bmatrix} \Phi_u \\ \Phi_\lambda \end{bmatrix} = \begin{bmatrix} M & 0 \\ 0 & 0 \end{bmatrix} \begin{bmatrix} \Phi_u \\ \Phi_\lambda \end{bmatrix} \Omega^2$$

where $\Omega = \mathrm{diag}(\omega_1, \omega_2, \dots)$ is the diagonal matrix of the natural angular frequencies, and Φ is the matrix of the mode shapes:

$$\Phi = \begin{bmatrix} \Phi_u \\ \Phi_\lambda \end{bmatrix}$$

The vectors of the subspace Φ represented by the columns of the matrix Φ have the following properties:

$$G^T \Phi_u = 0,$$

$$\Phi_u^T K \Phi_u = \Omega^2,$$

$$\Phi_u^T M \Phi_u = I_u$$

It follows from the last equation that for any column of the matrix Φ that can be written in a form of the vector, $$\varphi = \begin{Bmatrix} u \\ \lambda \end{Bmatrix},$$

where u denotes physical degrees of freedom, i.e. displacements, and λ denotes Lagrange multipliers, the physical degrees of freedom are not all zeroes, u≠0.

The Lagrange multiplier corrections vectors, Ψ, is the subspace of vectors with zero displacement degrees of freedom and nonzero Lagrange multipliers. The natural basis in this subspace of m vectors is:

$$\Psi = \begin{bmatrix} 0 \\ I_\lambda \end{bmatrix}$$

Note, that in such an embodiment, all columns of the matrix Ψ treated as vectors, satisfy the constraint equations. The vectors from the subspace Ψ have a particular mechanical sense. A sphere made from an incompressible elastic material statically loaded with a uniform external pressure gives an example when the solution expansion contains only vectors from the subspace Ψ. In this case, all of the physical degrees of freedom in (displacements) in the solution are zero, but the Lagrange multipliers are not. Therefore, the solution vector is included in the subspace Ψ. By construction, the vectors from the subspace Ψ are linearly independent from the vectors from the subspace Φ.

A third set of vectors that is suitable for the representation of the constrained dynamic problem solution are complementary basis vectors, Z. To construct the complete basis in $R_{n+m}$ an additional group of m linear independent vectors is needed. The columns of the following matrix represent this group of vectors:

$$Z = \begin{bmatrix} G \\ 0 \end{bmatrix}$$

The vectors from the subspace Z represented by the columns of the matrix Z are linearly independent because the rank (G)=m. Further, these vectors are linearly independent to the vectors from the subspace Ψ. The vectors from the subspace Z and the vectors from the subspace Φ are linearly independent because the eigenvectors satisfy the below constraint equations:

$$Z^T \Phi = \begin{bmatrix} G^T & 0 \end{bmatrix} \begin{bmatrix} \Phi_u \\ \Phi_\varphi \end{bmatrix} = G^T \Phi_u = 0$$

However, the vectors from the subspace Z do not satisfy the constraint equation because the columns of the matrix G are linearly independent and:

$$[G^T \; 0] Z = G^T G \neq 0$$

Therefore, the vectors from the subspace Z cannot contribute to the solution of the constrained problem.

Summarizing the properties of the basis vectors, Φ—eigenvectors, Ψ—Lagrange multiplier corrections, and Z—complementary basis vectors, it can be concluded that the solution to the constrained dynamic problem can be represented in the form below:

$$\begin{Bmatrix} u \\ \lambda \end{Bmatrix} = \Phi q + \Psi \xi = \begin{bmatrix} \Phi_u \\ \Phi_\lambda \end{bmatrix} q + \begin{Bmatrix} 0 \\ \xi \end{Bmatrix}$$

where q is the vector of the generalized displacements, and ξ is the vector of the Lagrange multiplier corrections. In such an embodiment, the size of the vector ξ is m. The size of the vector q is equal to the number of vectors in the subspace defined by the modal content of the modal subspace Φ. Usually in the modal analyses the subspace Φ is truncated, and for practical engineering applications the dim(q)<n−m.

Such an embodiment of the method 110 continues by correcting the Lagrange multipliers in the transient modal dynamic analysis (113). The vector of generalized displacements q is obtained by solving the following system of modal differential equations of motion:

$$\overline{M}\ddot{q}+\overline{C}\dot{q}+\overline{K}q=\overline{f}(t)$$

where $\overline{M}$, $\overline{C}$, $\overline{K}$, and $\overline{f}$ are as defined below:

$$\overline{M} = \Phi^T \begin{bmatrix} M & 0 \\ 0 & 0 \end{bmatrix} \Phi = \Phi_u^T M \Phi_u = I_u$$

$$\overline{C} = \Phi^T \begin{bmatrix} C & 0 \\ 0 & 0 \end{bmatrix} \Phi = \Phi_u^T C \Phi_u$$

$$\overline{K} = \Phi^T \begin{bmatrix} K & G \\ G^T & 0 \end{bmatrix} \Phi = \Phi_u^T K \Phi_u + (G^T \Phi_u)^T \Phi_\lambda + \Phi_\lambda^T (G^T \Phi_u) = \Omega^2$$

$$\overline{f} = \Phi^T \begin{Bmatrix} f(t) \\ 0 \end{Bmatrix} = \Phi_u^T f(t)$$

To calculate the Lagrange multiplier correction the solution is written in the form:

$$\begin{Bmatrix} u \\ \lambda \end{Bmatrix} = \begin{bmatrix} \Phi_u \\ \Phi_\lambda \end{bmatrix} q + \begin{Bmatrix} 0 \\ \xi \end{Bmatrix}$$

and the residual vector r of the finite element system of equations of motion is calculated where:

$$r = \begin{Bmatrix} G\xi - \eta \\ 0 \end{Bmatrix},$$

$$\eta = f(t) - M\Phi_u\ddot{q} - C\Phi_u\dot{q} - (K\Phi_u + G\Phi_\lambda)q$$

The residual norm is minimized, obtaining the system of equations for the Lagrange multiplier correction shown hereinbelow:

$$\|r\|^2 = \|G\xi - \eta\|^2 \xrightarrow[\xi]{} \min$$

$$(G^T G)\xi = G^T \eta$$

The matrix $A=G^T G$ is a sparse m×m matrix that may be factorized a single time during the finite element analysis. Further, according to an embodiment, the elements of the vector η, defined hereinabove, need only be calculated for the degrees of freedom of the Lagrange multipliers that are used in the constraint equations. Further still, according to such an embodiment, recovering of the Lagrange multipliers can be performed for all of the time increments simultaneously after completion of the modal analysis.

An embodiment of the present invention may correct Lagrange multipliers in the frequency response analysis of the finite element simulation. In such an embodiment, equations of motion in the frequency domain have the following form:

$$(-\omega^2 M + i\omega C + K + iS)u = f$$

where K, C, and M are the stiffness matrix, viscous damping matrix, and mass matrix respectively, as described hereinabove. Further, S represents the structural damping matrix, and f and u are the complex load and response amplitudes, respectively. In such an embodiment, the system of equations for the constrained problem can be in the form:

$$\left(-\omega^2 \begin{bmatrix} M & 0 \\ 0 & 0 \end{bmatrix} + i\omega \begin{bmatrix} C & 0 \\ 0 & 0 \end{bmatrix} + \begin{bmatrix} K & G \\ G^T & 0 \end{bmatrix} + i \begin{bmatrix} S & 0 \\ 0 & 0 \end{bmatrix}\right) \begin{Bmatrix} u \\ \lambda \end{Bmatrix} = \begin{Bmatrix} f \\ 0 \end{Bmatrix}$$

Further, the solution (frequency response) may be represented in the form:

$$\begin{Bmatrix} u \\ \lambda \end{Bmatrix} = \begin{bmatrix} \Phi_u \\ \Phi_\lambda \end{bmatrix} q + \begin{Bmatrix} 0 \\ \xi \end{Bmatrix}$$

where q is the modal frequency response obtained by solving the following equation:

$$(-\omega^2 \overline{M} + i\omega \overline{C} + \overline{K} + i\overline{S})q = \overline{f}$$

where $\overline{M}=I_u$, $\overline{C}=\Phi_u^T C \Phi_u$, $\overline{K}=\Omega^2$, $\overline{S}=\Phi_u^T S \Phi_u$, $\overline{f}=\Phi_u^T f$. The residual of the FEM system of equations has the form $$r = \begin{Bmatrix} G\xi - \eta \\ 0 \end{Bmatrix},$$

$$\eta = f - (-\omega^2 M + i\omega C + K + iS)\Phi_u q - G\Phi_\lambda q$$

Using the above, the system of equations for the Lagrange multiplier correction calculation can be obtained by minimizing the residual norm $$\|r\|^2 = \|G\xi - \eta\|^2 \xrightarrow[\xi]{} \min$$

$$(G^T G)\xi = G^T \eta$$

The matrix $A=G^T G$ is a sparse m×m matrix that, according to an embodiment, is only factorized once during the analysis. Further, the elements of the complex vector η may be calculated only for the degrees of freedom that are used in the constraint equations. Recovering of the Lagrange multipliers can be performed for all of the frequency points simultaneously after the modal analysis is completed.

The above described process for performing a modal analysis and determining correction terms to correct Lagrange multipliers may be implemented in blocks 112 and 113 of the method 110. For example, in an embodiment of the method 110, implemented by a computing device, the above described process may be carried out by execution of computer program instructions.

Figure 2:
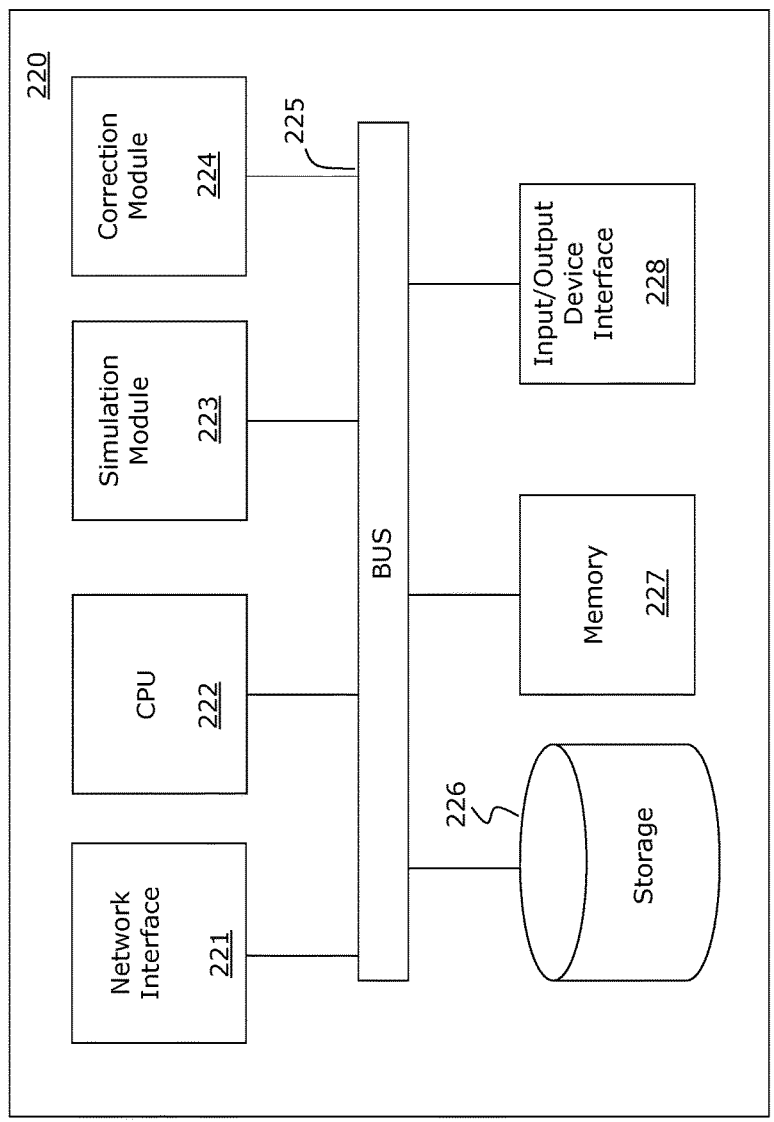
FIG. 2 is a simplified block diagram of a system for performing a modal analysis according to an embodiment of the present invention.

FIG. 2 is a simplified block diagram of a computer-based system 220 that may be used to perform a modal analysis according to an embodiment of the present invention. The system 220 comprises a bus 225. The bus 225 serves as an interconnect between the various components of the system 220. Connected to the bus 225 is an input/output device interface 228 for connecting various input and output devices such as a keyboard, mouse, display, speakers, etc. to the system 220. A central processing unit (CPU) 222 is connected to the bus 225 and provides for the execution of computer instructions. Memory 227 provides volatile storage for data used for carrying out computer instructions. Storage 226 provides non-volatile storage for software instructions, such as an operating system (not shown). The system 220 also comprises a network interface 221 for connecting to any variety of networks known in the art, including wide area networks (WANs) and local area networks (LANs).

Further connected to the bus 225 is a simulation module 223. The simulation module 223 is configured to provide a FEM and to employ the FEM in a modal analysis modeling stress and reaction forces of the FEM using Lagrange multipliers. The simulation module 223, may provide the FEM through any means known in the art. For example, the simulation module 223 may facilitate a user's construction of a FEM. In yet another embodiment, the simulation module 223 may obtain a FEM that is stored on the storage device 226 or memory 227. Further still, the simulation module 223 may provide the FEM from any point communicatively coupled to the system 220 via the network interface 221 and/or input/output device interface 228.

The system 220 further comprises a correction module 224 that is communicatively/operatively coupled to the simulation module 223. The correction module 224 is configured to calculate a correction term and modify the modal analysis by using the calculated correction term to alter the Lagrange multipliers.

It should be understood that the example embodiments described herein may be implemented in many different way. In some instances, the various methods and machines described herein may each be implemented by a physical, virtual, or hybrid general purpose computer, such as the computer system 220. The computer system 220 may be transformed into the machines that execute the methods described herein, for example, by loading software instructions into either memory 227 or non-volatile storage 226 for execution by the CPU 222. Further, while the simulation module 223 and correction module 224 are shown as separate modules, in an example embodiment these modules may be implemented using a variety of configurations.

The system 220 and its various components may be configured to carry out any embodiments of the present invention described herein. For example, the system 220 may be configured to carry out the method 110 described hereinabove in relation to FIG. 1. In an example embodiment, the simulation module 223 and correction module 224 may be implemented in software that is stored on the memory 227 and/or storage device 226. In such an example embodiment, the CPU 222 and the memory 227 with computer code instructions stored on the memory 227 and/or storage device 226 implement a simulation module that provides a FEM and employs the FEM in a modal analysis modeling stress and reaction forces of the FEM using Lagrange multipliers. Further, the components of the system 220 implement a correction module that is operatively coupled to the simulation module and configured to calculate a correction term and modify the modal analysis using the correction term to alter the Lagrange multipliers. In an example embodiment, the system 220, performs both the modal analysis and modifies (and improves) the modal analysis according to the one or more embodiments described herein. In yet another embodiment, the system 220 is communicatively coupled to a system performing the modal analysis and serves to modify the modal analysis as described herein.

Figure 3:
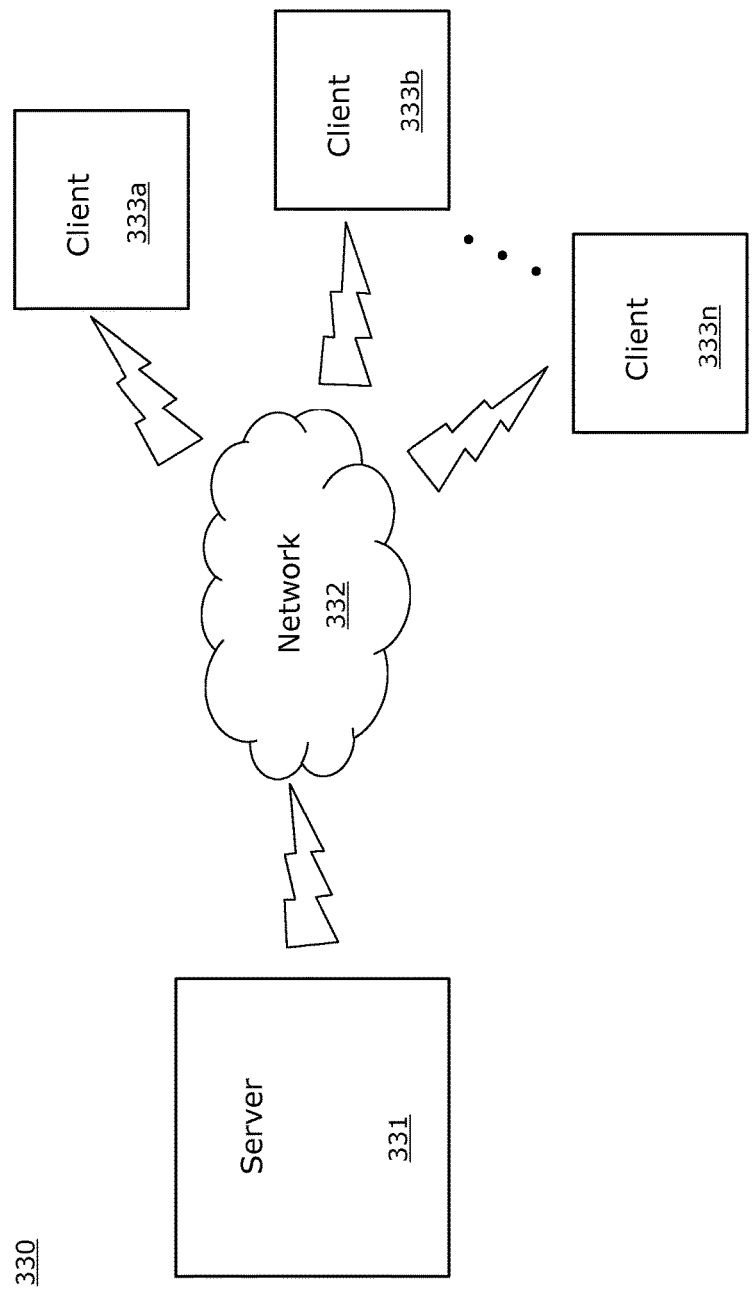
FIG. 3 is a simplified diagram of a computer network environment in which an embodiment of the present invention may be implemented.

FIG. 3 illustrates a computer network environment 330 in which an embodiment of the present invention may be implemented. In the computer network environment 330, the server 331 is linked through the communications network 332 to the clients 333a-n. The environment 330 may be used to allow the clients 333a-n, alone or in combination with server 331, to execute any of the methods described hereinabove.

It should be understood that the example embodiments described above may be implemented in many different ways. In some instances, the various methods and machines described herein may each be implemented by a physical, virtual, or hybrid general purpose computer, or a computer network environment such as the computer environment 330.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of simulating a modeled real-world object under dynamic excitation, the method comprising:
   providing a finite element model (FEM) to a computer-aided design (CAD) system, the FEM representing a real-world object;
   employing, by the CAD system, the FEM in a modal analysis for modeling stress and reaction forces of the FEM, the modal analysis modeling structural response of the FEM as a system of equations that includes constraints applied to the FEM, the constraints being represented using Lagrange multipliers;
   calculating a correction term that comprises corrected values of the Lagrange multipliers of the system of equations modeling structural response of the FEM, the calculating includes minimizing the norm of residual of the system of equations modeling structural response of the FEM;
   modifying the modal analysis using the correction term to correct values of the Lagrange multipliers, the modified modal analysis providing accurate stress and reaction force results; and
   using the stress and reaction force results by the CAD system to accurately simulate the real-world object under dynamic excitation.

2. The method of claim 1 wherein calculating the correction term comprises:
   solving the system of equations that represent motion of the FEM by solving a system of linear algebraic equations with a sparse matrix.

3. The method of claim 2 wherein the sparse matrix of the system of linear algebraic equations is factorized once in the modal analysis.

4. The method of claim 1 wherein modifying the modal analysis using the correction term to correct the values of the Lagrange multipliers comprises:
   modifying one or more degrees of freedom associated with the Lagrange multipliers.

5. The method of claim 1 wherein the modal analysis models a structural response of the FEM as a superposition of eigenmodes.

6. The method of claim 5 wherein the eigenmodes are obtained in a frequency extraction analysis that is a component of the modal analysis.

7. The method of claim 1 wherein the Lagrange multipliers are corrected for all frequency points of the modal analysis.

8. A computer system for performing a modal analysis on simulating a modeled real-world object under dynamic excitation, the system comprising:
   a processor; and
   a memory with computer code instructions stored thereon, the memory operatively coupled to the processor such that, when executed by the processor, the computer code instructions cause the computer system to implement:
   a simulation module of a computer-aided design (CAD) system configured to:
   receive a finite element model (FEM), the FEM representing a real-world object;
   employ the FEM in a modal analysis for modeling stress and reaction forces of the FEM, the modal analysis modeling structural response of the FEM as a system of equations that includes constraints applied to the FEM, the constraints being represented using Lagrange multipliers;
   a correction module operatively coupled to the simulation module and configured to:
   calculate a correction term that comprises corrected values of the Lagrange multipliers of the system of equations modeling structural response of the FEM, the calculating includes minimizing the norm of residual of the system of equations modeling structural response of the FEM; and
   modify the modal analysis using the correction term to correct values of the Lagrange multipliers, the modified modal analysis providing accurate stress and reaction force results; and
   the simulation module of the CAD system further configured to use the stress and reaction force results to accurately simulate the real-world object under dynamic excitation.

9. The system of claim 8 wherein the correction module is configured to calculate the correction term by solving the system of equations that represent motion of the FEM by solving a system of linear algebraic equations with a sparse matrix.

10. The system of claim 9 wherein the correction module is configured to factorize the sparse matrix of the system of linear algebraic equations once in the modal analysis.

11. The system of claim 8 wherein the correction module is configured to modify the modal analysis using the correction term to correct the values of the Lagrange multipliers by modifying one or more degrees of freedom associated with the Lagrange multipliers.

12. The system of claim 8 wherein the modal analysis models a structural response of the FEM as a superposition of eigenmodes.

13. The system of claim 12 wherein the simulation module is configured to obtain the eigenmodes in a frequency extraction analysis that is a component of the modal analysis.

14. The system of claim 8 wherein the correction module is configured to correct the Lagrange multipliers for all frequency points of the modal analysis.

15. A computer program product executed by a server in communication across a network with one or more clients, the computer program product comprising:
   a non-transitory computer readable medium, the computer readable medium comprising program instructions for simulating a modeled real-world object under dynamic excitation which, when executed by a processor causes:
   providing a finite element model (FEM) to a computer-aided design (CAD) system, the FEM representing a real-world object;
   employing, by the CAD system, the FEM in a modal analysis for modeling stress and reaction forces of the FEM, the modal analysis modeling structural response of the FEM as a system of equations that include constraints applied to the FEM, the constraints being represented using Lagrange multipliers;
   calculating a correction term that comprises corrected values of the Lagrange multipliers of the system of equations modeling structural response of the FEM, the calculating includes minimizing the norm of residual of the system of equations modeling structural response of the FEM;
   modifying the modal analysis using the correction term to correct values of the Lagrange multipliers, the modified modal analysis providing accurate stress and reaction force results; and using the stress and reaction force results by the CAD system to accurately simulate the real-world object under dynamic excitation.

16. The computer program product of claim 15 wherein calculating the correction term comprises:
    solving the system of equations that represent motion of the FEM by solving a system of linear algebraic equations with a sparse matrix.

17. The computer program product of claim 16 wherein the sparse matrix of the system of linear algebraic equations is factorized once in the modal analysis.

18. The computer program product of claim 15 wherein modifying the modal analysis using the correction term to correct the values of the Lagrange multipliers comprises:
    modifying one or more degrees of freedom associated with the Lagrange multipliers.

19. The computer program product of claim 15 wherein the modal analysis models a structural response of the FEM as a superposition of eigenmodes.

20. The computer program product of claim 19 wherein the eigenmodes are obtained in a frequency extraction analysis that is a component of the modal analysis.

* * * * *

UNITED STATES PATENT AND TRADEMARK OFFICE
CERTIFICATE OF CORRECTION

| | |
|---|---|
| PATENT NO. | : 10,311,180 B2 |
| APPLICATION NO. | : 14/331442 |
| DATED | : June 4, 2019 |
| INVENTOR(S) | : Mikhail Belyi, Vladimir Belsky and Victor Oancea |

Page 1 of 1

It is certified that error appears in the above-identified patent and that said Letters Patent is hereby corrected as shown below:

In the Claims

Column 11, Line 49, Claim 8, please delete "performing a modal analysis on"

Signed and Sealed this
Sixth Day of August, 2019

Andrei Iancu
*Director of the United States Patent and Trademark Office*